United States Patent
Bellehumeur et al.

(10) Patent No.: US 9,540,505 B2
(45) Date of Patent: *Jan. 10, 2017

(54) ENHANCED ESCR BIMODAL ROTOMOLDING RESIN

(71) Applicant: NOVA Chemicals (International) S.A., Fribourg (CH)

(72) Inventors: Celine Bellehumeur, Calgary (CA); Mark Hoidas, Calgary (CA)

(73) Assignee: NOVA Chemicals (International) S.A., Fribourg (CH)

( * ) Notice: Subject to any disclaimer, the term of this patent is extended or adjusted under 35 U.S.C. 154(b) by 0 days.

This patent is subject to a terminal disclaimer.

(21) Appl. No.: 14/856,622

(22) Filed: Sep. 17, 2015

(65) Prior Publication Data

US 2016/0002448 A1 Jan. 7, 2016

Related U.S. Application Data

(63) Continuation of application No. 14/535,612, filed on Nov. 7, 2014, now Pat. No. 9,181,422.

(51) Int. Cl.
*C08L 23/00* (2006.01)
*C08L 23/08* (2006.01)
*B29C 41/00* (2006.01)
*B29C 41/04* (2006.01)
*C08L 23/20* (2006.01)

(52) U.S. Cl.
CPC .......... *C08L 23/0815* (2013.01); *B29C 41/003* (2013.01); *B29C 41/04* (2013.01); *C08L 23/20* (2013.01); *C08L 2205/02* (2013.01); *C08L 2205/025* (2013.01)

(58) Field of Classification Search
CPC . C08L 23/0815; C08L 23/20; C08L 2205/025; C08L 2205/02; B29C 41/003; B29C 41/04
See application file for complete search history.

(56) References Cited

U.S. PATENT DOCUMENTS

| | | |
|---|---|---|
| 5,132,380 A | 7/1992 | Stevens et al. |
| 5,198,401 A | 3/1993 | Turner et al. |
| 5,292,845 A | 3/1994 | Kawasaki et al. |
| 5,382,630 A | 1/1995 | Stehling et al. |
| 5,382,631 A | 1/1995 | Stehling et al. |
| 6,969,741 B2 | 11/2005 | Lustiger et al. |
| 8,022,143 B2 | 9/2011 | Wang |
| 8,114,946 B2 | 2/2012 | Yang et al. |
| 8,475,899 B2 | 7/2013 | Yang et al. |
| 8,486,323 B2 | 7/2013 | Davis et al. |
| 8,492,498 B2 | 7/2013 | Buck et al. |
| 9,074,082 B2 * | 7/2015 | Wang et al. ........ C08L 23/0815 |
| 9,096,745 B2 * | 8/2015 | Lam et al. ............. C08L 23/06 |
| 9,181,422 B2 * | 11/2015 | Bellehumeur et al. ................... C08L 23/0815 |
| 2007/0298508 A1 | 12/2007 | DesLauriers et al. |

FOREIGN PATENT DOCUMENTS

WO 2005/121239 A2 12/2005

OTHER PUBLICATIONS

Randall, James C.; A Review of High Resolution Liquid 13 Carbon Nuclear Magnetic Resonance Characterizations of Ethylene-Based Polymers; JMC—Rev. Macromol. Chem. Phys., C29 (2&3), (1989), pp. 201-317.

DesLauriers, Paul J. and Rohlfing, David C.; Estimating Slow Crack Growth Performance of Polyethylene Resins from Primary Structures Such as Molecular Weight and Short Chain Branching; Macromol. Symp. 2009, 282, pp. 136-149.

* cited by examiner

*Primary Examiner* — Nathan M Nutter

(74) *Attorney, Agent, or Firm* — Lawrence T. Kale

(57) ABSTRACT

The present disclosure provides a resin suitable for use in rotational molding having an environmental stress crack resistance of greater than 1000 hours. The resin has a density from 0.937 to 0.942 g/cm$^3$, a melt index $I_2$ determined according to ASTM D 1238 (2.16 kg/190° C.—$I_2$) from 4.0 to 7.0 g/10 min, an $I_{21}$ determined according to ASTM D 1238 (21.6 kg/190° C.—$I_{21}$) from 160 to 200 g/10 min, an $I_{21}/I_2$ from 30 to 40 and a terminal vinyl unsaturation greater than 0.06, per 1000 carbon atoms; and a primary structure parameter (PSP2) of from 4 to 7, and an overall Mw/Mn from 2.7 to 3.5 comprising from 2 to 5 weight % of one or more $C_{4-8}$ alpha olefin comonomers.

7 Claims, 6 Drawing Sheets

ENHANCED ESCR BIMODAL ROTOMOLDING RESIN

CROSS REFERENCE TO RELATED PATENT APPLICATION

This application is a continuation of U.S. application Ser. No. 14/535,612, filed on Nov. 7, 2014, entitled "Enhanced ESCR Bimodal Rotomolding Resin", which is herein incorporated by reference in its entirety.

FIELD

The present disclosure relates to polyethylene for use in rotomolding articles. The polymers have exceptional environmental stress crack resistance in view of its high flow properties and stiffness which are useful in a number of custom applications including larger parts.

BACKGROUND

There are a number of different considerations for manufacturing a resin suitable for use in rotomolding manufacture. The resin needs to be: capable of production at commercially acceptable rates of production; suitable for use in the rotomolding process (e.g., for example, having a suitable sintering temperature and a suitable cooling rate to be removed from the mold) and finally have suitable properties for the end use application. One important property sought is environmental stress crack resistance. The resin should not develop cracks due to exposure to chemicals, sunlight, etc. in applications, such as, tank sprayers for agricultural use, cisterns, and smaller rotomolded parts.

U.S. Pat. Nos. 5,382,630, and 5,382,631 issued Jan. 17, 1995 to Stehling, assigned to Exxon, teach bimodal resins having superior physical properties. The patent requires that the blend have two or more components each having a polydispersity (Mw/Mn) less than 3 and the blend having a polydispersity greater than 3 and no component in the blend having a relatively higher molecular weight and a lower comonomer content (i.e., the comonomer incorporation is reverse). The reference does not suggest improved ESCR.

U.S. Pat. No. 6,969,741 issued Nov. 29, 2005 to Lustiger et al., assigned to ExxonMobil teaches a blend of polyethylenes suitable for rotomolding. The patent teaches the difference in the density of each component is not less than 0.030 g/cm$^3$. The difference in the densities of the component polymers in the present composition is less than 0.030 g/cm$^3$.

U.S. Pat. No. 8,486,323 issued Jul. 16, 2013 in the name of Davis, assigned to Dow Global technologies Inc., teaches polymer blends used in rotational molded articles and having a high impact resistance. The blends have a residual unsaturation of less than 0.06 per 1000 carbon atoms. Embodiments in the present disclosure have a residual unsaturation of greater than 0.06 per 1000 carbon atoms.

U.S. Pat. No. 8,492,498 issued Jul. 23, 2013 from an application filed Feb. 21, 2011 in the name of Buck et al., assigned to Chevron Phillips discloses a high density polymer suitable for rotational molding that has a bent strip ESCR condition A greater than 1000 hours, as determined by ASTM D 1693 in 100% IGEPAL CO-630. The polymer also has a primary structure parameter (PSP2) of greater than 8.9. Embodiments in the present disclosure have a primary structure parameter (PSP2) of from 4 to 7.

U.S. Pat. No. 8,114,946 issued Feb. 14, 2012, and U.S. Pat. No. 8,475,899 issued Jul. 2, 2013, both claiming a priority date of Dec. 18, 2008 in the name of Yang et al., assigned to Chevron Phillips teach a polymer prepared using a bridged metallocene catalyst and having a long chain branch (LCB) content of less than 0.008 per 1000 carbon atoms, by implication LCB are present in the polymer. The catalyst and process used to make the compositions of the present disclosure do not produce detectable long chain branching.

The present disclosure seeks to provide a high density polyethylene resin having exceptional environmental stress crack resistance (ESCR) and good flow properties. Flow properties are important for rotomolding resins as the resin must soften and flow in the mold. If the flow properties are too low the resin does not sinter together in a reasonable amount of time and the product cannot be made in an economical manner.

SUMMARY

One embodiment provides a bimodal polyethylene composition having a density from about 0.937 to about 0.942 g/cm$^3$, a melt index $I_2$ determined according to ASTM D 1238 (2.16 kg load at 190° C.—$I_2$) from about 4.0 to about 7.0 g/10 min, and $I_{21}$ determined according to ASTM D 1238 (21.6 kg load at 190° C.—$I_{21}$) from about 160 to about 200 g/10 min, an $I_{21}/I_2$ from about 30 to about 40, a bent strip ESCR as determined by ASTM D 1693 in 100% octoxynol –9 for conditions A and B of greater than 1000 hours and a terminal vinyl unsaturation greater than 0.06, preferably greater than about 0.08 per 1000 carbon atoms; a primary structure parameter (PSP2) of from 4 to 7, preferably from about 5 to about 6, and an overall Mw/Mn from about 2.7 to about 3.5 comprising from about 2 to about 6 weight % of one or more $C_{4-8}$ alpha olefin comonomers which when de-convoluted into two components consists of:

(i) from about 20 to about 45, preferably about 20 to about 35, most preferably from about 25 to about 35, weight % of a first component with a branch frequency per 1000 carbon atoms by FTIR between about 3 and about 13, said component having a density as determined according to ASTM D 792 from about 0.920 to about 0.930 g/cm$^3$; a weight average molecular weight (Mw) from about 100,000 to about 180,000 preferably from about 110,000 to about 165,000, most preferably from about 120,000 to about 150,000 g/mol and a polydipsersity of less than 3; and (ii) from about 80 to about 55, preferably from about 80 to about 65, most preferably from about 75 to about 65 weight % of a second component comprising from 0 up to about 1 wt %, preferably from about 0.2 to about 0.6 wt % of one or more of one or more $C_{4-8}$ alpha olefin comonomers and the balance ethylene said component having a density as determined according to ASTM D 792 from about 0.945 to about 0.955 g/cm$^3$; a weight average molecular weight (Mw) from about 15,000 to about 70,000, preferably from about 20,000 to about 40,000 and a polydispersity of less than 3, wherein the difference in densities between components (i) and (ii) is less than 0.030, preferably less than about 0.027 g/cm$^3$, and the composition has no detectable long chain branches.

A further embodiment provides a bimodal polyethylene composition as above having a primary structure parameter (PSP2) from about 4 to about 7.

Another embodiment provides a bimodal polyethylene composition as above wherein component (i) is present in an amount from about 20 to about 35 weight %.

A further embodiment provides a bimodal polyethylene composition as above, wherein component (i) consists of from about 1 to about 25 weight % of one or more of one or more $C_{4-8}$ alpha olefin comonomers and the balance ethylene.

Another embodiment provides a bimodal polyethylene composition as above wherein component (i) has a weight average molecular weight (Mw) from about 120,000 to about 150,000 g/mol and a polydipsersity of less than 3.

A further embodiment provides a bimodal polyethylene composition as above wherein component (ii) is present in an amount from about 65 to about 80 weight %.

Another embodiment provides a bimodal polyethylene composition as above wherein component (ii) has a weight average molecular weight (Mw) from about 20,000 to about 50,000 and a polydispersity of less than 3.

A further embodiment provides a bimodal polyethylene composition as above wherein the difference in densities between components (i) and (ii) is less than 0.030, preferably less than about 0.027 $g/cm^3$.

Another embodiment provides a process to make a bimodal polyethylene composition as above, comprising feeding ethylene and one or more $C_{4-8}$ comonomers to two sequential solution phase reactors, in the presence of a single site catalyst comprising a phosphinimine ligand together with one or more activators.

A further embodiment provides a rotomolded part consisting essentially of the above bimodal polyethylene composition.

DETAILED DESCRIPTION

Numbers Ranges

[1] Other than in the operating examples or where otherwise indicated, all numbers or expressions referring to quantities of ingredients, reaction conditions, etc. used in the specification and claims are to be understood as modified in all instances by the term "about". Accordingly, unless indicated to the contrary, the numerical parameters set forth in the following specification and attached claims are approximations that can vary depending upon the desired properties of the disclosed embodiments. At the very least, and not as an attempt to limit the application of the doctrine of equivalents to the scope of the claims, each numerical parameter should at least be construed in light of the number of reported significant digits and by applying ordinary rounding techniques.

[2] Notwithstanding that the numerical ranges and parameters setting forth the broad scope of this disclosure are approximations, the numerical values set forth in the specific examples are reported as precisely as possible. Any numerical values, however, inherently contain certain errors necessarily resulting from the standard deviation found in their respective testing measurements.

[3] Also, it should be understood that any numerical range recited herein is intended to include all sub-ranges subsumed therein. For example, a range of "1 to 10" is intended to include all sub-ranges between and including the recited minimum value of 1 and the recited maximum value of 10; that is, having a minimum value equal to or greater than 1 and a maximum value of equal to or less than 10. Because the disclosed numerical ranges are continuous, they include every value between the minimum and maximum values. Unless expressly indicated otherwise, the various numerical ranges specified in this application are approximations.

[4] All compositional ranges expressed herein are limited in total to and do not exceed 100 percent (volume percent or weight percent) in practice. Where multiple components can be present in a composition, the sum of the maximum amounts of each component can exceed 100 percent, with the understanding that, and as those skilled in the art readily understand, that the amounts of the components actually used will conform to the maximum of 100 percent.

Figure 1:
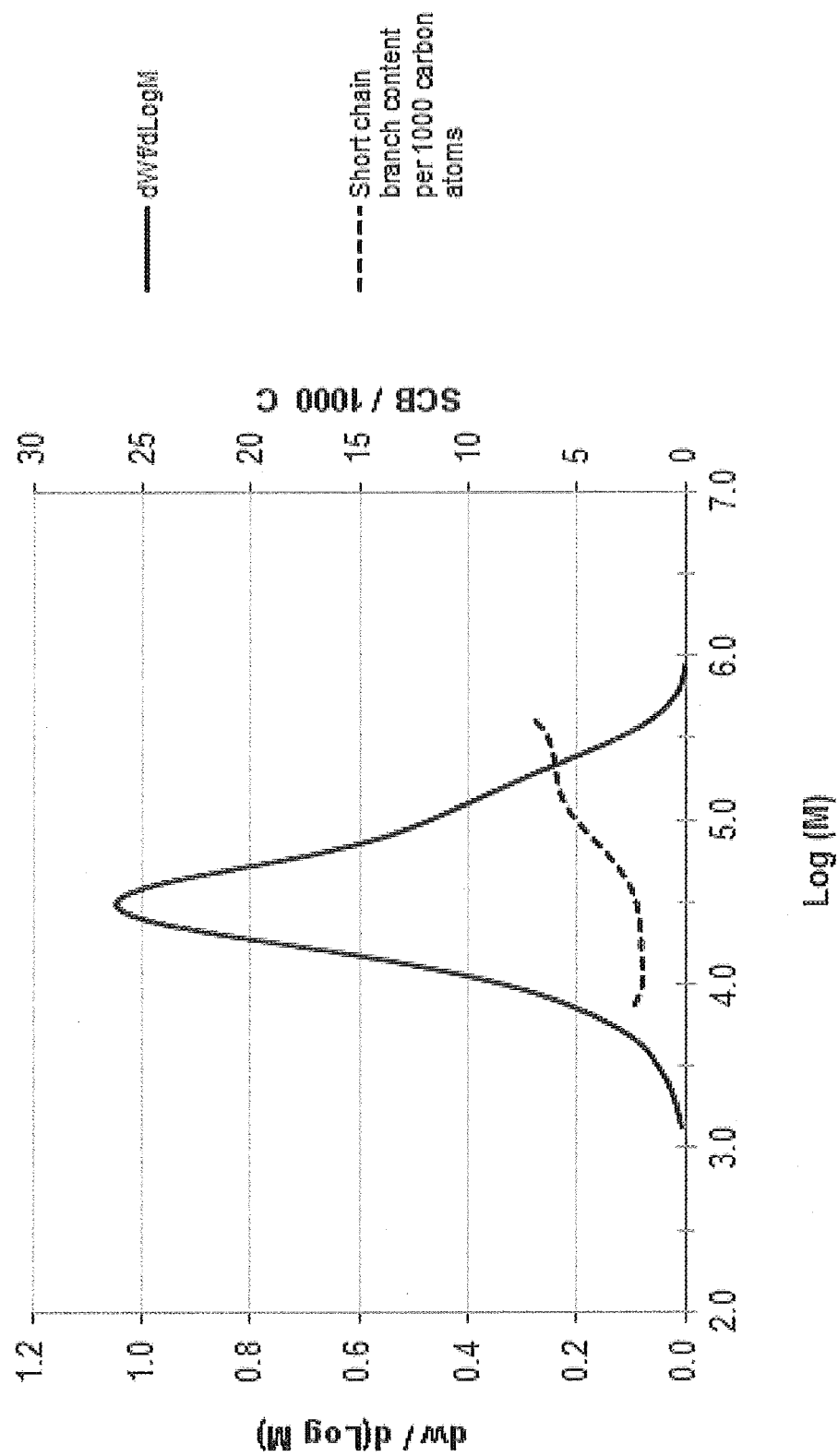
FIG. 1 is a plot of the molecular weight distribution obtained by gel permeation chromatograph (GPC), and the short chain branching distribution determined from GPC-FTIR of a resin of example 1.
Figure 2:
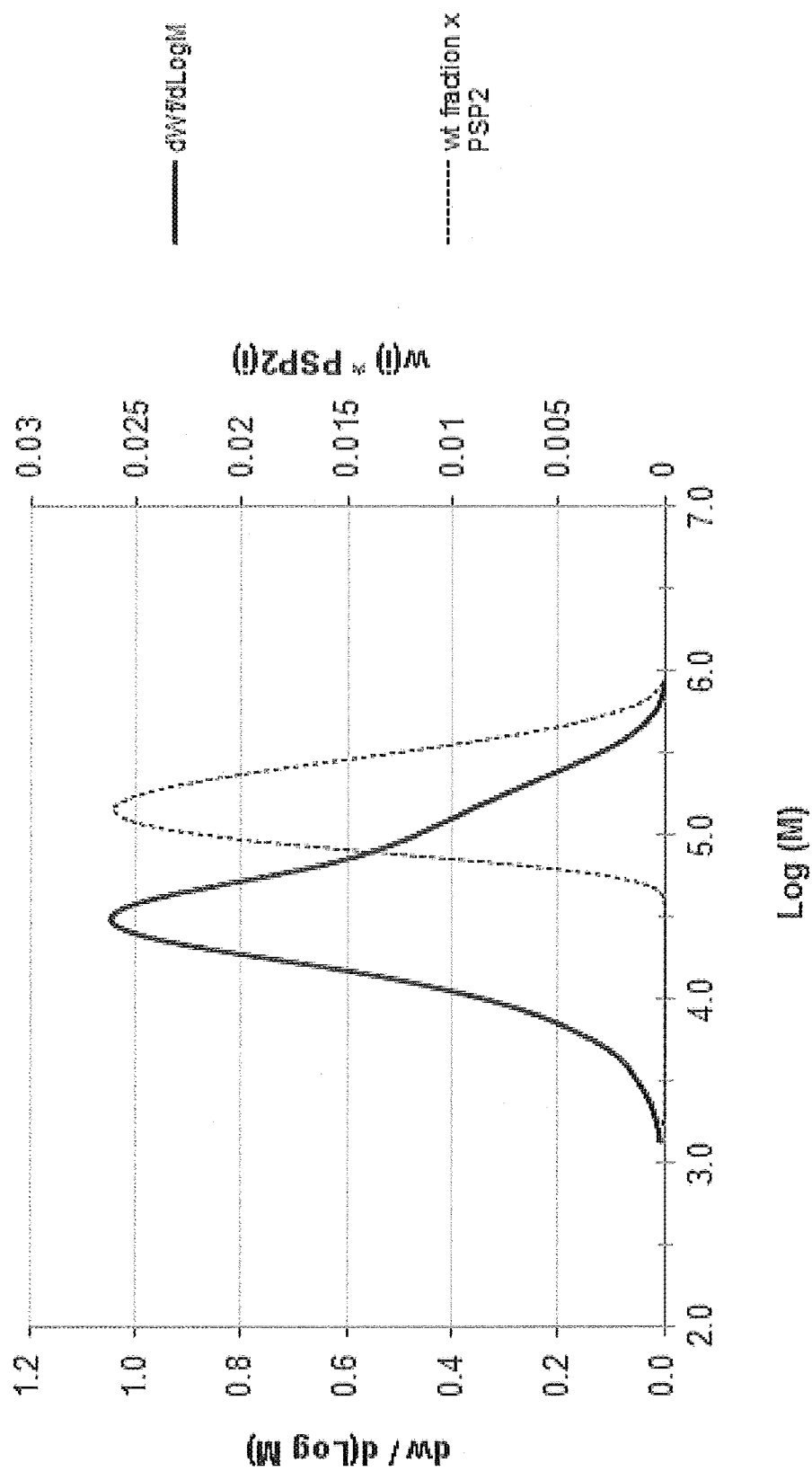
FIG. 2 is a plot of the calculated $w_i \cdot PSP2_i$ values against log M for the resin of example 1.

The compositions of the present disclosure are bimodal polyethylene and can be de-convoluted into two distinct components. Typically, this is demonstrated by the presence of a "shoulder" at the right side of a gel permeation chromatography (GPC) curve (FIG. 1). In the present case, there is a small shoulder to the right side of the GPC curve as shown in FIG. 2 indicating a small amount of a higher molecular weight low density component.

The overall polyethylene composition comprises from about 0.1 to about 8.0 weight %, typically from about 2.0 to about 6.0 weight % of one or more $C_{4-8}$ alpha olefins and the balance ethylene. Preferably, the comonomer is 1-octene or 1-hexene.

In one embodiment, the higher molecular weight component is present in an amount from about 20 to about 45 weight % of the entire composition, preferably from about 20 to about 35 weight %, most preferably from about 25 to about 30 weight %, based on the weight of the entire composition. The lower molecular weight component is present in corresponding amounts from about 80 to about 55 weight %, of the entire composition, preferably from about 80 to about 65 weight %, most preferably from about 75 to about 70 weight % based on the weight of the entire composition.

The higher molecular weight component has a weight average molecular weight (Mw) greater than about 100,000, typically from about 110,000 to about 165,000, in other cases, from about 120,000 to about 150,000, as determined using gel permeation chromatography (GPC). The higher molecular weight component has a polydispersity (Mw/Mn: weight average molecular weight/number average molecular weight)) less than 3 (e.g., between 2 and 3) typically less than about 2.7.

The higher molecular weight component has a lower density than the lower molecular weight component. The density of the higher molecular weight component in the composition may range from about 0.920 to about 0.930 g/cm$^3$, typically from about 0.922 to about 0.926 g/cm$^3$, in other cases, from about 0.922 to about 0.925 g/cm$^3$. The density of the component, or that of any other component or the total composition, is a function of the degree of comonomer incorporation. The higher molecular weight component has a degree of short chain branching per 1000 carbon atoms from about 3 to about 13, typically, from about 4 to about 10, in other cases, from about 4 to about 8. The higher molecular weight component does not have any long chain branching.

The lower molecular weight component has a weight average molecular weight (Mw) less than about 100,000, typically, from about 15,000 to about 70,000, in some cases, from about 20,000 to about 50,000, in other cases, from about 20,000 to about 40,000 g/mol, as determined using gel permeation chromatography (GPC). The lower molecular weight component has a polydispersity (Mw/Mn) less than 3 (e.g., from 2 to 3), typically, less than about 2.8.

The lower molecular weight component has a higher density than the higher molecular weight component. The density of the lower molecular weight component in the composition is greater than about 0.945 g/cm$^3$, typically from about 0.945 to about 0.955 g/cm$^3$, and, in some cases, from about 0.947 to about 0.952 g/cm$^3$. The lower molecular weight (higher density component) has a degree of short chain branching of less than about 5 per 1000 carbon atoms, typically, from about 0.5 to about 4, and, in some cases from about 1 to about 3 short chain branches per 1000 carbon atoms. The lower molecular weight component does not have any long chain branching.

The difference in density of the higher molecular weight component and the lower molecular weight components is less than 0.030 g/cm$^3$, preferably, less than about 0.027 g/cm$^3$.

The catalysts used to produce the bimodal polyethylene compositions do not produce long chain branching.

The overall properties of the bimodal polyethylene compositions include the following:

density from about 0.935 to about 0.942 g/cm$^3$;

melt index under a load of 2.16 kg (12) at a temperature of 190° C. as determined by ASTM 1238 from about 4 to about 7, and, in some cases, from about 4.5 to about 6 g/10 minutes;

a melt index under a load of 21.6 kg (121) at a temperature of 190° C. as determined by ASTM 1238 from about 150 to about 210, and, in some cases, from about 160 to about 200 g/10 minutes;

a melt flow ratio ($I_{21}/I_2$) from about 28 to about 40, and, in some cases, from about 30 to about 37;

a primary structure parameter (PSP2) from about 4 to about 7, and, in some cases, from about 5 to about 6;

an ESCR at condition A 100% IGEPAL® CO-630 (octoxynol-9) greater than 1000 hours; and an ESCR at condition B 100% IGEPAL® CO-630 greater than 1000 hours.

Overall, the composition comprises from about 2 to about 8 weight %, and, in some cases, from about 2 to about 5 weight % of one or more $C_{4-8}$ comonomers.

The overall bimodal polyethylene composition incorporates the following molecular features:

short chain branch frequency/1000 carbon atoms by FTIR between about 1 and about 8, and, in some cases, between about 3 and about 6;

comonomer content (wt. %) by FTIR from about 0.1 to about 8.0, and in some cases from about 2.0 to about 5.0;

internal unsaturation per 1000 carbon atoms by FTIR from about 0.07 to about 0.3;

side chain unsaturation per 1000 carbon atoms by FTIR typically less than about 0.1;

terminal unsaturation per 1000 carbon atoms by FTIR from about 0.07 to about 0.14;

number average molecular weight (Mn) by GPC from about 11,000 to about 35,000, and, in some cases, from about 20,000 to about 25,000;

weight average molecular weight Mw) by GPC from about 55,000 to about 82,000, and, in some cases, from about 60,000 to about 70,000;

Z average molecular weight (Mz) by GPC from about 140,000 to about 200,000, and, in some cases, from about 160,000 to about 180,000;

polydispersity (Mn/Mw) from about 2.7 to about 5, in some cases from about 2.8 to about 4, and, in still other cases, less than about 3.5;

an index (Mz/Mw) from about 2.0 to about 2.9, and, in some cases, from about 2.30 to about 2.60; and a primary structure parameter (PSP2) of from about 4 to about 7, and, in some cases, from about 5 to about 6.

The PSP2 calculation as outlined by DesLauriers and Rohlfing in Macromolecular Symposia (2009), 282 (Polyolefin Characterization—ICPC 2008), pages 136-149, is incorporated by reference herein. The PSP2 calculation can be generally described as a multistep process. The first step involves estimating the homopolymer (or low comonomer polymer) density of a sample from the sample's molecular weight distribution as described by Equation 1. The first step takes into account the effects of molecular weight on sample density.

$$1/\rho = \Sigma(w_i/\rho_i) = \int 1/\rho (dw/d \log M) d \log M \qquad \text{(Eq. 1)}$$

where: $\rho = 1.0748 - (0.0241) \log M$.

Density values at molecular weights less than 720 g/mol are equal to 1.006 g/cm$^3$ according to this method. In the second step, to further account for the added contributions to density suppression by the presence of short chain branching for each molecular weight (MW) slice, the difference between the measured bulk density of copolymer and the calculated homopolymer density is divided by the overall short chain branching (SCB) level (as measured by size exclusion chromatography-Fourier transform infrared spectroscopy or by C13-NMR) and subsequently applied to the SCB level in each MW slice. The original observed bulk density of the copolymer (down to 0.852 g/cm$^3$) is obtained through summation of the MW slices as described above. The calculations have been simplified by assuming that all SCB levels will have the same effect on density suppression. However, it is to be understood that the effectiveness of a particular SCB level to suppress density will vary (i.e., the ability of SCB to disrupt crystallinity decreases as the level of SCB increases). Alternately, if the density of the copolymer is not known, then the effects of SCB on sample density can be estimated in the second step by using Equation 2 as described by DesLauriers and Rohlfing in Patent Application Publication No. 2007/0298508, where the change in density $\Delta\rho$ refers to the value that is subtracted from the value given in equation 1 on a molecular slice by slice basis.

$$\Delta\rho = C_1(SCB/PDI^n)^{C_2} - C_3(SCB/PDI^n)^{C_4} \qquad \text{(Eq. 2)}$$

In Equation 2, $C_1=1.25\text{E-}02$, $C_2=0.5$, $C_3=7.51\text{E-}05$, $C_4=0.62$ and $n=0.32$.

The third step in calculating PSP2 is to calculate the quantity of $2\,l_c + l_a$ where $l_c$ is the estimated crystalline lamella thickness (in nm) and $l_a$ is the estimated thickness (in nm) of the amorphous material at a particular molecular weight given by the following equations:

$$T_m(°C.) = (20587.5149640828)\rho^3 - (63826.2771547794)\rho^2 + (65965.7028912473) - 22585.2457979131 \quad \text{(Eq 3.)}$$

$$l_c(\text{nm}) = \frac{0.624\,\text{nm} \cdot T_m^0(K)}{T_m^0(K) - T_m(K)} \quad \text{(Eq. 4)}$$

In Equation 3, assigned values of 20° C. and 142.5° C. are given for density values of 0.852 g/cm³ and 1.01 g/cm³, respectively. Equation 4 is a form of the well accepted Gibbs Thompson equation. The thickness of the amorphous layer ($l_a$) is calculated using the equations 5a and 5b:

$$w_c = \left(\frac{\rho_c}{\rho}\right)\left(\frac{\rho - \rho_a}{\rho_c - \rho_a}\right) \quad \text{(Eq. 5a)}$$

$$l_a = \rho_c l_c (1 - w_c)/\rho_a w_c \quad \text{(Eq. 5b)}$$

where:
$w_c$=weight fraction crystallinity
$\rho$=calculated density of MW slice
$\rho_c$=density of 100% crystalline sample (assigned 1.006 g/cm³)
$\rho_a$=density of amorphous phase (0.852 g/cm³)
The fourth step calculates the tie molecule probability (P) for each molecular weight and respective $2\,l_c + l_a$ value according to equations 6a and 6b:

$$P = \frac{1}{3}\frac{\int_L^\infty r^2 \exp(-b^2 r^2)\,dr}{\int_0^\infty r^2 \exp(-b^2 r^2)\,dr} \quad \text{(Eq. 6a)}$$

where $b^2 = \dfrac{3}{2\bar{r}^2}$ and $\bar{r}^2 = (Dnl^2)$.

The symbols above have the following meanings:
P=Probability of tie-chain formation
L=Critical distance (nm)=$2\,l_c + l_a$
D=Chain extension factor in melt=6.8 for polyethylene
n=Number of links=Mw/14 for polyethylene
l=The link length=0.153 nm for polyethylene $$P = \frac{1}{3}\frac{\frac{\sqrt{\pi}}{4b^3} - \int_0^L r^2 \exp(-b^2 r^2)\,dr}{\frac{\sqrt{\pi}}{4b^3}} \quad \text{(Eq. 6b)}$$

$$= \frac{1}{3}\left(1 - \frac{4b^3}{\sqrt{\pi}}\int_0^L r^2 \exp(-b^2 r^2)\,dr\right)$$

Finally PSP2 values are calculated from Equations 6a and 6b by treating this value essentially as a weighing factor ($P_i$) for each slice of the MWD, where $P_i$ was arbitrarily multiplied×100 and subsequently defined as PSP2. As in all of the aforementioned calculations, this value at each slice is multiplied by the respective weight fraction ($w_i$) of the MWD profile in order to obtain a value for the bulk polymer.

A plot of the calculated $w_i \cdot \text{PSP2}$ values against log M for the inventive Example 1 is shown in FIG. 2, which can also be insightful when attempting to understand and predict structure property relationships. The area underneath the resulting $w_i \cdot \text{PSP2}$ vs. log M curve defines PSP2 for the whole polymer sample.

The polymer may be made using a solution polymerization technique. In the solution polymerization of ethylene with one or more comonomers, non-limiting examples of comonomers include $C_{3-8}$ α-olefins; in some cases, 1-hexene or 1-octene are preferred, or; in other cases, 1-octene is preferred. Monomers are typically dissolved in an inert hydrocarbon solvent, typically, a $C_{5-12}$ hydrocarbon, which may be unsubstituted or substituted by a $C_{1-4}$ alkyl group, such as pentane, methyl pentane, hexane, heptane, octane, cyclohexane, methylcyclohexane and hydrogenated naphtha. An example of a suitable solvent that is commercially available is "Isopar E" ($C_{8-12}$ aliphatic solvent, Exxon Chemical Co.).

Catalyst and activators are also dissolved in the solvent or suspended in a diluent miscible with the solvent at reaction conditions.

The Catalyst

The catalyst is a compound of the formula

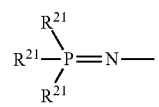

wherein M is selected from the group consisting of Ti, Zr and Hf; PI is a phosphinimine ligand of the formula:

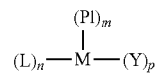

wherein each $R^{21}$ is independently selected from the group consisting of a hydrogen atom; a halogen atom; hydrocarbyl radicals, typically, $C_{1-10}$, which are unsubstituted by or further substituted by a halogen atom; $C_{1-8}$ alkoxy radicals; $C_{6-10}$ aryl or aryloxy radicals; amido radicals; silyl radicals of the formula:

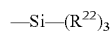
—Si—$(R^{22})_3$ wherein each $R^{22}$ is independently selected from the group consisting of hydrogen, a $C_{1-8}$ alkyl or alkoxy radical and $C_{6-10}$ aryl or aryloxy radicals; and a germanyl radical of the formula:

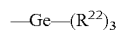
—Ge—$(R^{22})_3$ wherein $R^{22}$ is as defined above;
L is a monoanionic cyclopentadienyl-type ligand independently selected from the group consisting of cyclopentadienyl-type ligands, Y is independently selected from the group consisting of activatable ligands; m is 1 or 2; n is 0 or 1; p is an integer and the sum of m+n+p equals the valence state of M.

Suitable phosphinimines are those in which each $R^{21}$ is a hydrocarbyl radical, preferably a $C_{1-6}$ hydrocarbyl radical, most preferably a $C_{1-4}$ hydrocarbyl radical.

The term "cyclopentadienyl" refers to a 5-member carbon ring having delocalized bonding within the ring and, typically, being bound to the active catalyst site, generally, a group 4 metal (M) through $\eta^5$-bonds. The cyclopentadienyl ligand may be unsubstituted or up to fully substituted with one or more substituents selected from the group consisting of $C_{1-10}$ hydrocarbyl radicals which are unsubstituted or further substituted by one or more substituents selected from the group consisting of a halogen atom and a $C_{1-4}$ alkyl radical; a halogen atom; a $C_{1-8}$ alkoxy radical; a $C_{6-10}$ aryl or aryloxy radical; an amido radical which is unsubstituted or substituted by up to two $C_{1-8}$ alkyl radicals; a phosphido radical which is unsubstituted or substituted by up to two $C_{1-8}$ alkyl radicals; silyl radicals of the formula —Si—$(R)_3$ wherein each R is independently selected from the group consisting of hydrogen, a $C_{1-8}$ alkyl or alkoxy radical, $C_{6-10}$ aryl or aryloxy radicals; and germanyl radicals of the formula Ge—$(R)_3$ wherein R is as defined above.

The cyclopentadienyl-type ligand may be selected from the group consisting of a cyclopentadienyl radical, an indenyl radical and a fluorenyl radical, which radicals are unsubstituted or up to fully substituted by one or more substituents selected from the group consisting of a fluorine atom, a chlorine atom; $C_{1-4}$ alkyl radicals; and a phenyl or benzyl radical which is unsubstituted or substituted by one or more fluorine atoms.

Activatable ligands Y may be selected from the group consisting of a halogen atom, $C_{1-4}$ alkyl radicals, $C_{6-20}$ aryl radicals, $C_{7-12}$ arylalkyl radicals, $C_{6-10}$ phenoxy radicals, amido radicals which may be substituted by up to two $C_{1-4}$ alkyl radicals and $C_{1-4}$ alkoxy radicals. In some cases, Y is selected from the group consisting of a chlorine atom, a methyl radical, an ethyl radical and a benzyl radical.

Suitable phosphinimine catalysts are Group 4 organometallic complexes which contain one phosphinimine ligand (as described above) and one cyclopentadienyl-type (L) ligand and two activatable ligands. The catalysts are not bridged.

Activators:

The activators for the catalyst are typically selected from the group consisting of aluminoxanes and ionic activators.

Alumoxanes:

Suitable alumoxane may be of the formula: $(R^4)_2AlO(R^4AlO)_mAl(R_4)_2$ wherein each $R^4$ is independently selected from the group consisting of $C_{1-20}$ hydrocarbyl radicals and m is from 0 to 50, preferably, $R^4$ is a C1-4 alkyl radical and m is from 5 to 30. A non-limiting example of a suitable alumoxane is methylalumoxane (or "MAO") in which each R is methyl.

Alumoxanes are well known as cocatalysts, particularly for metallocene-type catalysts. Alumoxanes are also readily available articles of commerce.

The use of an alumoxane cocatalyst generally requires a molar ratio of aluminum to the transition metal in the catalyst from about 20:1 to about 1000:1; or, in other cases, from about 50:1 to about 250:1.

Commercially available MAO typically contains free aluminum alkyl (e.g., trimethylaluminum or "TMA") which may reduce catalyst activity and/or broaden the molecular weight distribution of the polymer. If a narrow molecular weight distribution polymer is required, it is preferred to treat such commercially available MAO with an additive which is capable of reacting with the TMA; non-limiting examples of suitable additives include alcohols or hindered phenols.

"Ionic Activators" Cocatalysts:

So-called "ionic activators" are also well known for metallocene catalysts. See, for example, U.S. Pat. No. 5,198,401 (Hlatky and Turner) and U.S. Pat. No. 5,132,380 (Stevens and Neithamer).

While not wishing to be bound by any theory, it is thought by those skilled in the art that "ionic activators" initially cause the abstraction of one or more of the activatable ligands in a manner which ionizes the catalyst into a cation, then provides a bulky, labile, non-coordinating anion which stabilizes the catalyst in a cationic form. The bulky, non-coordinating anion permits olefin polymerization to proceed at the cationic catalyst center (presumably, because the non-coordinating anion is sufficiently labile to be displaced by monomer which coordinates to the catalyst. Non-limiting examples of ionic activators are boron-containing ionic activators such as:

compounds of the formula $[R^5]^+[B(R^7)_4]^-$ wherein B is a boron atom, $R^5$ is an aromatic hydrocarbyl (e.g., triphenyl methyl cation) and each $R^7$ is independently selected from the group consisting of phenyl radicals which are unsubstituted or substituted with from 3 to 5 substituents selected from the group consisting of a fluorine atom, a $C_{1-4}$ alkyl or alkoxy radical which is unsubstituted or substituted by a fluorine atom; and a silyl radical of the formula —Si—$(R^9)_3$; wherein each $R^9$ is independently selected from the group consisting of a hydrogen atom and a $C_{1-4}$ alkyl radical; and compounds of the formula $[(R^8)_tZH]^+[B(R^7)_4]^-$ wherein B is a boron atom, H is a hydrogen atom, Z is a nitrogen atom or phosphorus atom, t is 2 or 3 and $R^8$ is selected from the group consisting of $C_{1-8}$ alkyl radicals, a phenyl radical which is unsubstituted or substituted by up to three $C_{1-4}$ alkyl radicals, or one $R^8$ taken together with the nitrogen atom may form an anilinium radical and $R^7$ is as defined above; and compounds of the formula $B(R^7)_3$ wherein $R^7$ is as defined above.

In the above compounds, preferably $R^7$ is a pentafluorophenyl radical, and $R^5$ is a triphenylmethyl cation, Z is a nitrogen atom and $R^8$ is a $C_{1-4}$ alkyl radical or $R^8$ taken together with the nitrogen atom forms an anilinium radical which is substituted by two $C_{1-4}$ alkyl radicals.

The "ionic activator" may abstract one or more activatable ligands so as to ionize the catalyst center into a cation but not to covalently bond with the catalyst and to provide sufficient distance between the catalyst and the ionizing activator to permit a polymerizable olefin to enter the resulting active site.

Examples of ionic activators include: triethylammonium tetra(phenyl)boron; tripropylammonium tetra(phenyl)boron; tri(n-butyl)ammonium tetra(phenyl)boron; trimethylammonium tetra(p-tolyl)boron; trimethylammonium tetra(o-tolyl)boron; tributylammonium tetra(pentafluorophenyl)boron; tripropylammonium tetra(o,p-dimethylphenyl)boron; tributylammonium tetra(m,m-dimethylphenyl)boron; tributylammonium tetra(p-trifluoromethylphenyl)boron; tributylammonium tetra(pentafluorophenyl)boron; tri(n-butyl)ammonium tetra(o-tolyl)boron; N,N-dimethylanilinium tetra(phenyl)boron; N,N-diethylanilinium tetra(phenyl)boron; N,N-diethylanilinium tetra(phenyl)n-butylboron; N,N-2,4,6-pentamethylanilinium tetra(phenyl)boron; di-(isopropyl)ammonium tetra(pentafluorophenyl)boron; dicyclohexylammonium tetra(phenyl)boron; triphenylphosphonium tetra(phenyl)boron; tri(methylphenyl)phosphonium tetra(phenyl)boron; tri(dimethylphenyl)phosphonium tetra(phenyl)boron; tropillium tetrakispentafluorophenyl borate; triphenylmethylium tetrakispentafluorophenyl borate; benzene(diazonium)tetrakispentafluorophenyl borate; tropillium phenyltrispentafluorophenyl borate; triphenylmethylium phenyltrispentafluorophenyl borate; benzene(diazonium)phenyltrispentafluorophenyl borate; tropillium tetrakis(2,3,5,6-tetrafluorophenyl)borate; triphenylmethylium tetrakis(2,3,5,6-tetrafluorophenyl)borate; benzene(diazonium)tetrakis(3,4,5-trifluorophenyl)borate; tropillium tetrakis(3,4,5-trifluorophenyl)borate; benzene(diazonium)tetrakis(3,4,5-trifluorophenyl)borate; tropillium tetrakis(1,2,2-trifluoroethenyl)borate; triphenylmethylium tetrakis(1,2,2-trifluoroethenyl)borate; benzene(diazonium)tetrakis(1,2,2-trifluoroethenyl)borate; tropillium tetrakis(2,3,4,5-tetrafluorophenyl)borate; triphenylmethylium tetrakis(2,3,4,5-tetrafluorophenyl)borate; and benzene(diazonium)tetrakis(2,3,4,5-tetrafluorophenyl)borate.

Readily commercially available ionic activators include: N,N-dimethylaniliniumtetrakispentafluorophenyl borate; triphenylmethylium tetrakispentafluorophenyl borate; and trispentafluorophenyl borane.

The ionic activator may be use at about molar equivalents of boron to group IV metal in the catalyst. Suitable molar ratios of group IV metal from the catalyst to boron may range from about 1:1 to about 3:1, in other cases, from about 1:1 to about 1:2.

In some instances, the ionic activator may be used in combination with an alkylating activator (which may also serve as a scavenger). The ionic activator may be selected from the group consisting of $(R^3)_p MgX_{2-p}$ wherein X is a halide and each $R^3$ is independently selected from the group consisting of $C_{1-10}$ alkyl radicals and p is 1 or 2; $R^3Li$ wherein $R^3$ is as defined above; $(R^3)_q ZnX_{2-q}$ wherein $R^3$ is as defined above, X is halogen and q is 1 or 2; $(R^3)_s AlX_{3-s}$ wherein $R^3$ is as defined above, X is halogen and s is an integer from 1 to 3. Preferably, in the above compounds, $R^3$ is a $C_{1-4}$ alkyl radical, and X is chlorine. Commercially available compounds include triethyl aluminum (TEAL), diethyl aluminum chloride (DEAC), dibutyl magnesium ($(Bu)_2Mg$), and butyl ethyl magnesium (BuEtMg or BuMgEt).

If the phosphinimine catalyst is activated with a combination of ionic activators (e.g., boron compounds) and alkylating agent, the molar ratio of group IV metal from the catalyst:metalloid (boron) from the ionic activator:metal from the alkylating agent may range from about 1:1:1 to about 1:3:10, in other cases from about 1:1.3:5 to about 1:1.5:3.

Polymerization Process

The temperature of the reactor(s) in a high temperature solution process is from about 80° C. to about 300° C., in other cases, from about 120° C. to 250° C. The upper temperature limit will be influenced by considerations that are well known to those skilled in the art, such as a desire to maximize operating temperature (so as to reduce solution viscosity), while still maintaining good polymer properties (as increased polymerization temperatures generally reduce the molecular weight of the polymer). In general, the upper polymerization temperature may be between about 200 and about 300° C. The most preferred reaction process is a "medium pressure process", meaning that the pressure in the reactor(s) is preferably less than about 6,000 psi (about 42,000 kiloPascals or kPa). Preferred pressures are from about 10,000 to about 40,000 kPa (1450-5800 psi), most preferably from about 14,000 to about 22,000 kPa (2,000 psi to 3,000 psi).

In some reaction schemes, the pressure in the reactor system should be high enough to maintain the polymerization solution as a single phase solution and to provide the necessary upstream pressure to feed the polymer solution from the reactor system through a heat exchanger system and to a devolatilization system. Other systems permit the solvent to separate into a polymer rich and polymer lean stream to facilitate polymer separation.

The solution polymerization process may be conducted in a stirred "reactor system" comprising one or more stirred tank reactors or in one or more loop reactors or in a mixed loop and stirred tank reactor system. The reactors may be in tandem or parallel operation. In a dual tandem reactor system, the first polymerization reactor preferably operates at lower temperature. The residence time in each reactor will depend on the design and the capacity of the reactor. Generally, the reactors should be operated under conditions to achieve a thorough mixing of the reactants. In addition, it is preferred that from about 20 to about 60 weight % of the final polymer is polymerized in the first reactor, with the balance being polymerized in the second reactor.

A useful solution polymerization process uses at least two polymerization reactors in series. The polymerization temperature in the first reactor is from about 80° C. to about 180° C. (in other cases, from about 120° C. to 160° C.) and the second reactor is typically operated at a higher temperature (up to about 220° C.). The most preferred reaction process is a "medium pressure process", meaning that the pressure in each reactor is preferably less than about 6,000 psi (about 42,000 kilopascals or kPa), most preferably, from about 2,000 psi to about 3,000 psi (about 14,000 to about 22,000 kPa).

EXAMPLES

Test Methods

Mn, Mw and Mz (g/mol) were determined by high temperature Gel Permeation Chromatography (GPC) with differential refractive index detection using universal calibration (e.g., ASTM-D646-99). The molecular weight distribution (MWD) is the ratio of the weight average molecular weight (Mw) over the number average molecular weight (Mn).

GPC-FTIR was used to determine the comonomer content as a function of molecular weight. After separation of the polymer by GPC, an on-line FTIR measures the concentration of the polymer and methyl end groups. Methyl end groups are used in the branch frequency calculations. Conventional calibration allows for the calculation of a molecular weight distribution.

Mathematical de-convolutions were performed to determine the relative amount of polymer, molecular weight, and comonomer content of the component made in each reactor by assuming that each polymer component follows a Flory's molecular weight distribution function, and it has a homogeneous comonomer distribution across the whole molecular weight range. The uniform comonomer distribution of each resin component, which is the result from the use of a single site catalyst, allowed the estimation of the short chain branching content (SCB), in branches per 1000 carbon atoms for the first and second ethylene polymers, based on the de-convoluted relative amounts of first and second ethylene polymer components in the polyethylene composition, and their estimated resin molecular weight parameters from the above procedure.

The short chain branch frequency (SCB per 1000 carbon atoms) of copolymer samples was determined by Fourier Transform Infrared Spectroscopy (FTIR) as per ASTM D6645-01. A Thermo-Nicolet 750 Magna-IR Spectrophotometer was used for the measurement. FTIR was also used to determine internal, side chain and terminal levels of unsaturation.

Comonomer content can also be measured using $^{13}C$ NMR techniques as discussed in Randall Rev. Macromol. Chem. Phys., C29 (2&3), p. 285; U.S. Pat. No. 5,292,845 and WO 2005/121239.

Polyethylene composition density (g/cm$^3$) was measured according to ASTM D792.

Melt indexes $I_2$, $I_6$ and $I_{21}$ for the polyethylene composition were measured according to ASTM D1238.

The density and melt index of the first and second ethylene polymers that comprise the polyethylene composition were determined based on composition models. The following equations were used to calculate the density and melt index $I_2$ (REFERENCE U.S. Pat. No. 8,022,143 B2, by Wang, assigned to NOVA Chemicals and published Sep. 20, 2011):

$$\text{Density} = 0.979863 - 5.94808 \times 10^{-3}$$
$$\left(\frac{SCB}{1000\,C}\right)^{0.65} - 3.83133 \times 10^{-4}[\log_{10}(M_n)]^3 -$$
$$5.77986 \times 10^{-6}(M_w/M_n)^3 + 5.57395 + 10^{-3}(M_z/M_w)^{0.25}$$

$$\log_{10}(\text{Melt Index } I_2) = 22.326528 +$$
$$3.467 \times 10^{-3}[\log_{10}(M_n)]^3 - 4.322582[\log_{10}(M_w)] -$$
$$1.80061 \times 10^{-1}[\log_{10}(M_z)]^2 + 2.6478 \times 10^{-2}[\log_{10}(M_z)]^3$$

where Mn, Mw, Mz, and SCB/1000C are the de-convoluted values of the individual ethylene polymer components, as obtained from the results of the de-convolution described above.

Primary melting peak (° C.), heat of fusion (J/g) and crystallinity (%) were determined using differential scanning calorimetry (DSC) as follows: the instrument was first calibrated with indium; after which a polymer specimen is equilibrated at 0° C.; the temperature was increased to 200° C. at a heating rate of 10° C./min; the melt was then kept at that temperature for five minutes; the melt was then cooled to 0° C. at a cooling rate of 10° C./min and kept at 0° C. for five minutes; the specimen was heated a second time to 200° C. at a heating rate of 10° C./min. The melting peak (Tm), heat of fusion and crystallinity reported are calculated based on the second heating cycle.

Plaques molded from the polyethylene compositions were tested according to the following ASTM methods: Bent Strip Environmental Stress Crack Resistance (ESCR), ASTM D1693; Flexural properties, ASTM D 790; Tensile properties, ASTM D 638.

Rotomolded parts were prepared in a rotational molding machine sold under the tradename Rotospeed RS3-160 by Ferry Industries Inc. The machine has two arms which rotate about a central axis within an enclosed oven. The arms are fitted with plates which rotate on an axis that is roughly perpendicular to the axis of rotation of the arm. Each arm is fitted with six cast aluminum molds that produce plastic cubes having dimensions of 12.5 inches (31.8 cm)×12.5 inches×12.5 inches. The arm rotation was set to about 8 revolutions per minute (rpm) and the plate rotation was set to about 2 rpm. These molds produce parts having a nominal thickness of about 0.25 inches (0.64 cm) when initially filled with a standard charge of about 3.7 kg of polyethylene resin in powder form (35 US mesh size). The temperature within the enclosed oven was maintained at a temperature of 560° F. (293° C.). The molds and their content were heated for a specified period of time, until full powder densification is achieved. The molds were subsequently cooled in a controlled environment prior to removing the parts. Specimens were collected from the molded parts for density and color measurements The ARM impact test was performed in accordance with ASTM D5628 at a test temperature of −40° C.

The Resin

Bimodal polyethylene compositions were prepared at a dual reactor pilot plant. In this dual reactor process, the content of the first reactor flows into the second reactor, both of which are well mixed. The process operates using continuous feed streams. The catalyst (cyclopentadienyl tri (tertiary Butyl)phosphinimine titanium dichloride) with activator was fed to both reactors. The overall production rate was about 90 kg/hr.

The polymerization conditions are provided in Table 1.

TABLE 1

|  | Example 1 |
| --- | --- |
| Ethylene split between first reactor (R1) and second reactor (R2) (R1/(R1 + R2) | 0.30 |
| Octene split between first Reactor (R1) and second reactor (R2) | 1.0 |
| Octene to ethylene weight ratio in fresh feed | 0.11 |
| Hydrogen in reactor 1 (ppm) | 0.8 |
| Hydrogen in reactor 2 (ppm) | 7.8 |
| Reactor 1 temperature (° C.) | 140 |
| Reactor 2 temperature (° C.) | 212 |
| Catalyst feed in reactor 1 (ppm) | 0.2 |
| Catalyst feed in reactor 2 (ppm) | 0.47 |

The polymer compositions prepared at the pilot plant were stabilized using a conventional additive package for rotational molding applications prior to carrying out plaque testing trials.

The properties of the resulting resins are compared to an internal NOVA Chemicals base line resin and two commercially available rotomolding resins which are referred to as comparative Examples 2 and 3, respectively. Results are set forth in Table 2. The properties of pressed plaques as well as rotomolded parts made from the polyethylene compositions are presented in Tables 3 and 4.

TABLE 2

|  | Internal Base Resin | Inventive Example 1 | Commercial Resin W4101 Comparative Example 2 | Commercial Resin W4506 Comparative Example 3 |
| --- | --- | --- | --- | --- |
| Density (g/cm$^3$) | 0.9395 | 0.9395 | 0.9349 | 0.9396 |
| Melt Index $I_2$ (g/10 min) | 5.52 | 5.45 | 7.32 | 3.54 |
| Melt Index $I_6$ (g/10 min) | 20.9 | 23.9 | 28.4 | 14.1 |
| Melt Index $I_{21}$ (g/10 min) | 116 | 185 | 171 | 82.8 |
| Melt Flow Ratio ($I_{21}/I_2$) | 21 | 34 | 23.2 | 24.1 |
| Branch Freq/1000C | 3.7 | 4.6 | 7.4 | 4.4 |
| Comonomer ID | Octene | Octene | Octene | Octene |

TABLE 2-continued

| | Internal Base Resin | Inventive Example 1 | Commercial Resin W4101 Comparative Example 2 | Commercial Resin W4506 Comparative Example 3 |
|---|---|---|---|---|
| Comonomer Content (mole %) | 0.7 | 1.0 | 1.5 | 0.9 |
| Comonomer Content (wt %) | 2.9 | 3.7 | 5.7 | 3.4 |
| Internal Unsat/1000C | 0.19 | 0.19 | 0.02 | 0.01 |
| Side chain Unsat/1000C | 0.01 | 0.02 | 0.02 | 0.0 |
| Terminal Unsat/1000C | 0.1 | 0.09 | 0.4 | 0.38 |
| $M_n$ | 27680 | 24106 | 24199 | 33030 |
| $M_w$ | 66178 | 67459 | 58817 | 71148 |
| $M_z$ | 131600 | 170027 | 118009 | 135698 |
| Polydispersity Index ($M_w/M_n$) | 2.39 | 2.8 | 2.43 | 2.15 |
| Index (Mz/Mw) | 2.0 | 2.5 | 2.0 | 1.9 |
| Comonomer Distribution | Reverse | Reverse | Normal | Normal |
| PSP2 | 3.9 | 5.4 | 3.1 | 3.0 |

TABLE 3

| | Internal Base Resin | Inventive Example 1 | Commercial Resin W4101 Comparative Example 2 | Commercial Resin W4101 Comparative Example 3 |
|---|---|---|---|---|
| Flex Secant Mod 1% (MPa) | 809 | 836 | 624 | 757 |
| Flex Secant Mod 1% (MPa) Dev. | 23 | 18 | 20 | 36 |
| ESCR Cond A (hrs) 100% CO-360 | 74 | >1000 | 55 | 96 |
| ESCR Cond B (hrs) 100% CO-360 | 100-185 | >1000 | 55 | 96 |

Figure 3:
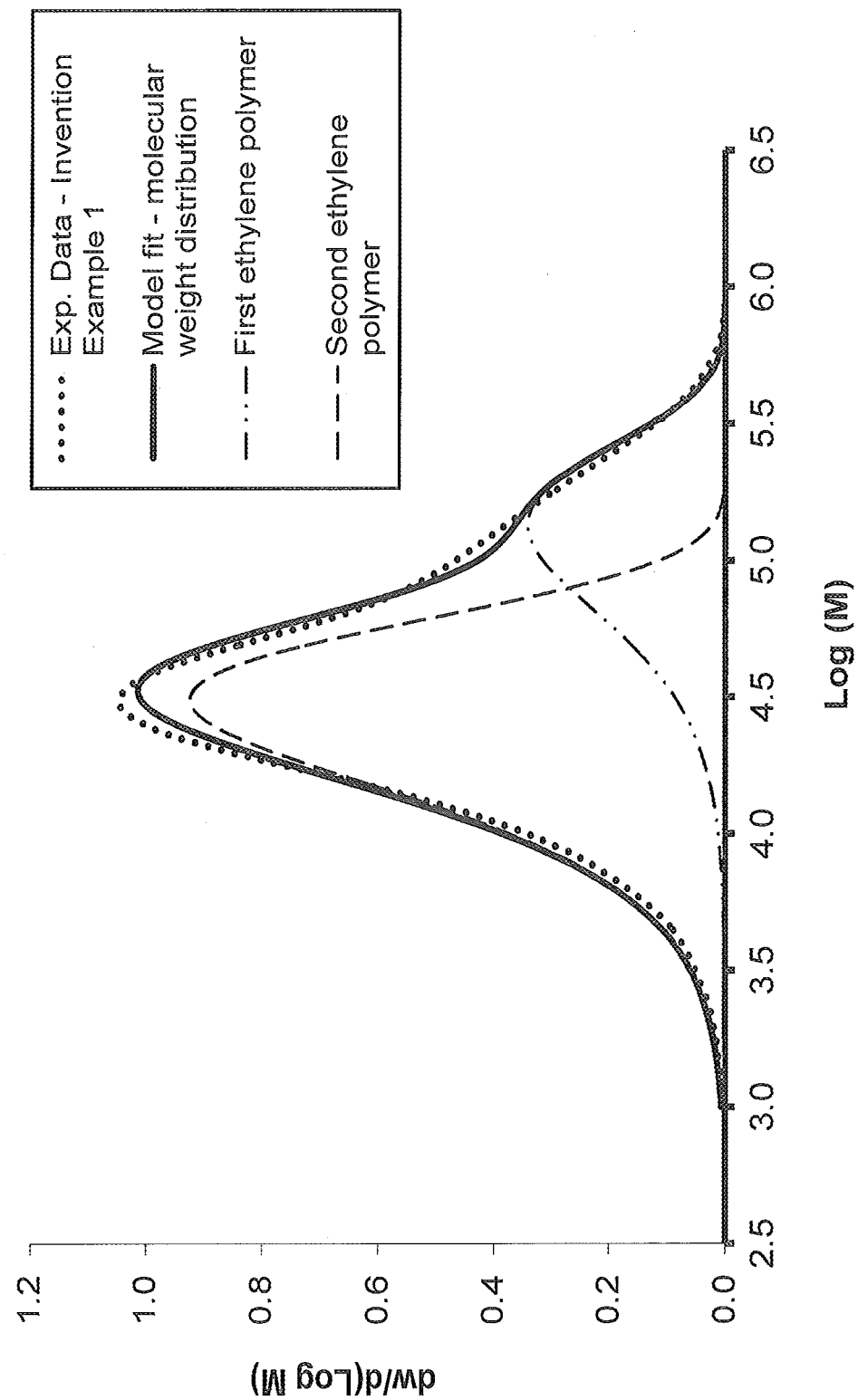
FIG. 3 is a plot of the molecular weight distribution obtained by GPC of the polymer of example 1 and the computer model predictions of the molecular weight distributions of the first and second ethylene polymers that comprise the polymer of example 1.
Figure 4:
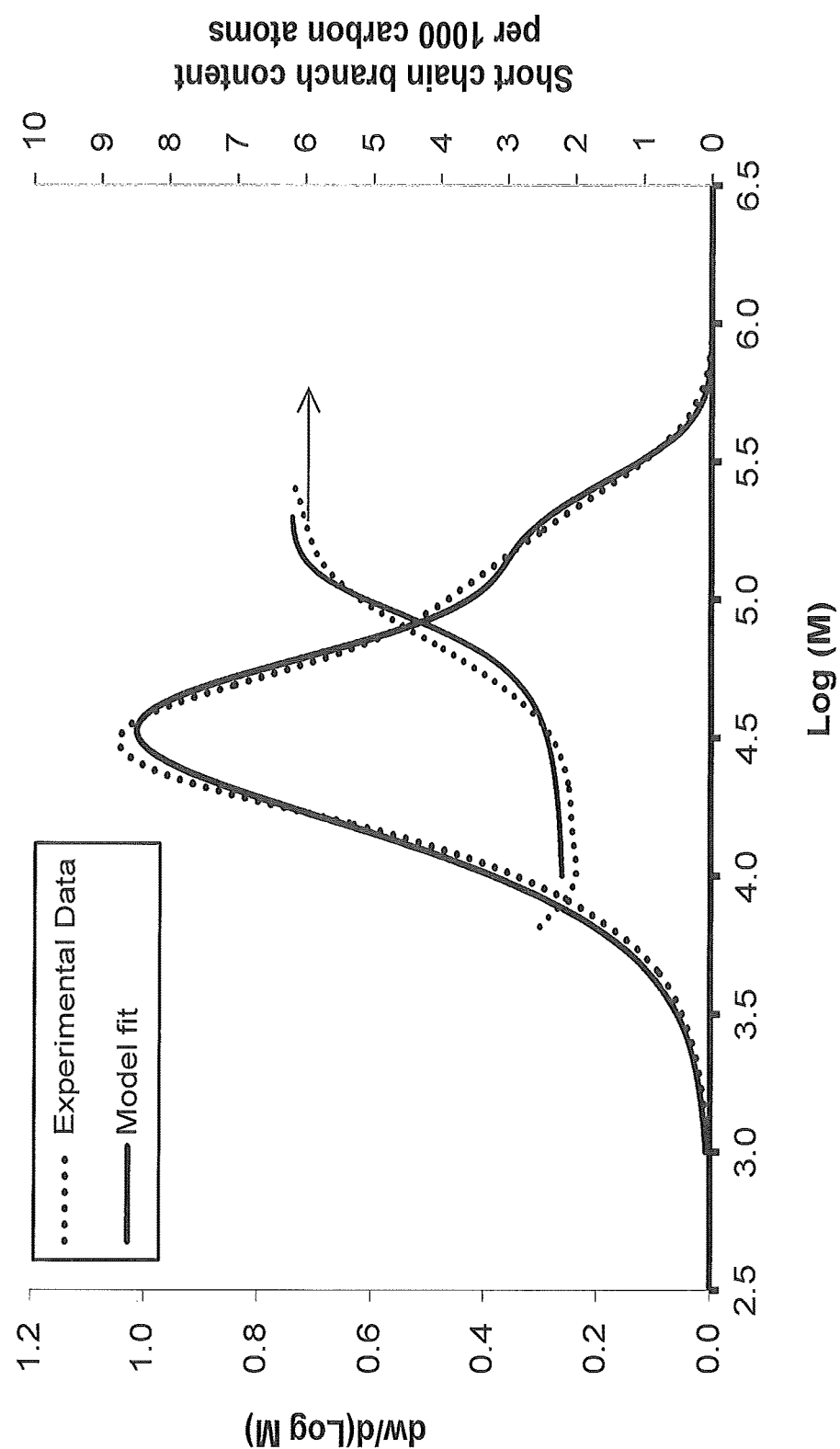
FIG. 4 is a plot of the molecular weight distribution obtained by gel permeation chromatograph (GPC), and the short chain branching distribution determined from GPC-FTIR of a resin of example 1. The plot also includes the computer model predictions of the polymer molecular weight distribution as well as the short chain branching distribution.
Figure 5:
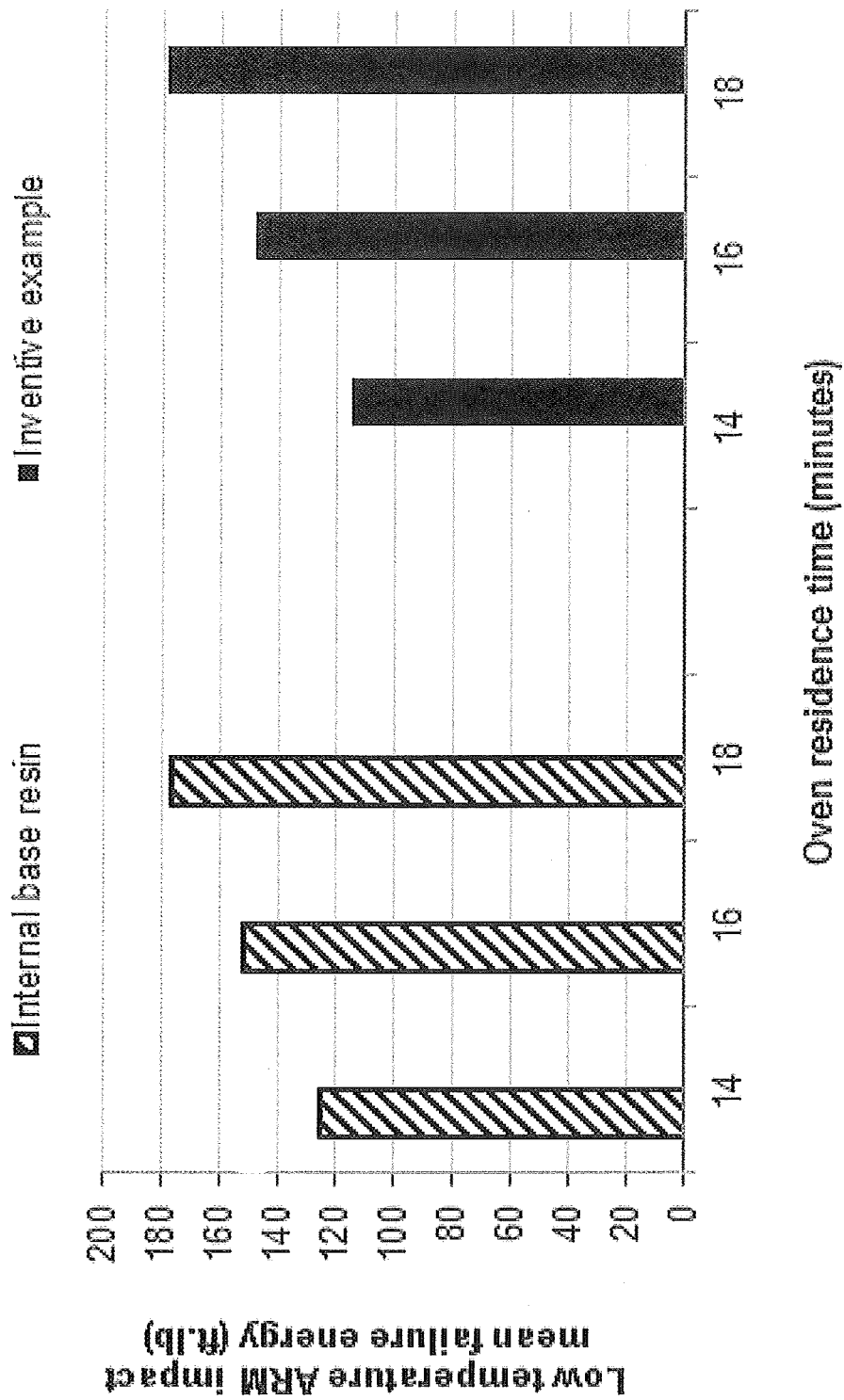
FIG. 5 is a plot of the mean failure energy from ARM impact testing carried out at −40° C. on specimens taken from rotomolded parts produced from the resin of example 1.
Figure 6:
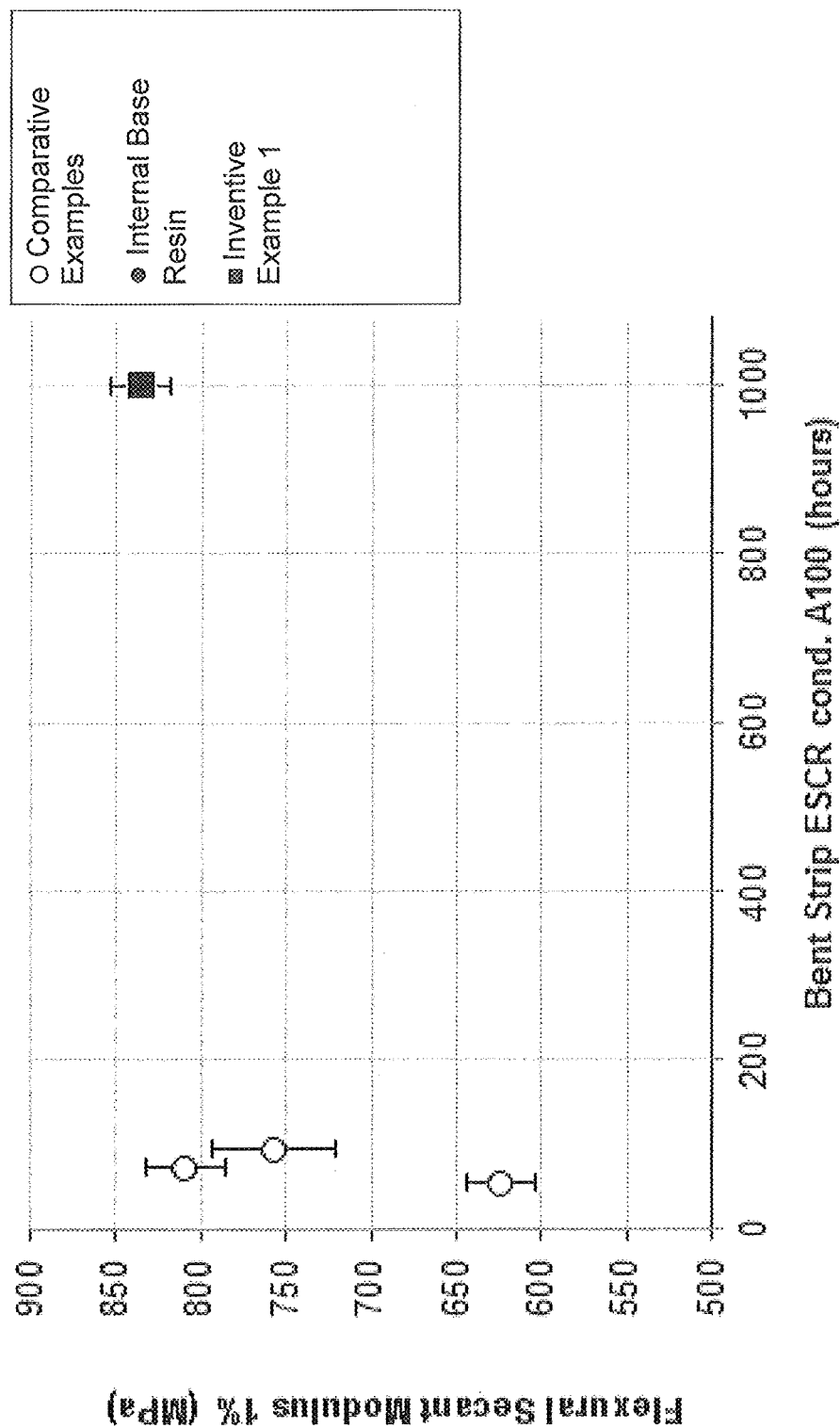
FIG. 6 is a plot of the bent strip ESCR condition A (100% IGEPAL® CO-630 (octoxynol-9)) against the flexural 1% secant modulus in MPa for the resin of Inventive Example 1 and Comparative Examples.

The data shows the inventive example has a good rotational molding process window (FIG. 3) together with excellent ESCR and stiffness performance (Table 3, FIG. 4). Compared to examples with similar densities, the compositions of the present disclosure combine both high comonomer content and reverse comonomer distribution. The molecular attributes of the disclosed embodiments provide a combination of good rotomolding processability, high ESCR and a high density that in turn favors higher stiffness.

What is claimed is:

1. A bimodal polyethylene composition having a density from 0.935 to 0.942 g/cm³, a melt index I₂ determined according to ASTM D 1238 (2.16 kg 190° C.—$I_2$) from 4.0 to 7.0 g/10 min, and $I_{21}$ determined according to ASTM D 1238 (21.6 kg 190 C—$I_{21}$) from 150 to 210 g/10 min, an $I_{21}/I_2$ from 28 to 40, a bent strip ESCR as determined by ASTM D 1693 in 100% octoxynol −9 for conditions A and B of greater than 1000 hours, a terminal vinyl unsaturation from 0.07 to 0.14 per 1000 carbon atoms, a number average molecular weight (Mn) from 11,000 to 35,000 as determined by GPC, a weight average molecular weight (Mw) from 55,000 to 82,000 as determined by GPC, a Z average molecular weight (Mz) from 140,000 to 2000,000 as determined by GPC, an overall Mw/Mn from 2.8 to 4.0, an index of Mz/Mw from 2 to 2.9 (paragraph 60) comprising from 0.1 to 8 weight % of one or more $C_{4-8}$ alpha olefin comonomers as determined by FTIR which when de-convoluted into two components consists of:

(i) from 20 to 45 weight % of a first component consisting of from 1 to 25 wt. % of one or more $C_{4-8}$ alpha olefin comonomers and the balance ethylene, said component having a density as determined according to ASTM D 792 from 0.920 to 0.930 g/cm³; a weight average molecular weight (Mw) from 100,000 to 180,000 g/mol, a polydispersity between 2 and 3, and a degree of short chain branching from 3 to 13 per 1000 carbon atoms as determined by GPC-FTIR; and (ii) from 80 to 55 weight % of a second component comprising one or more of $C_{4-8}$ alpha olefin comonomers and the balance ethylene said component having a density as determined according to ASTM D 792 from 0.945 to 0.955 g/cm³, a weight average molecular weight (Mw) from 15,000 to 70,000, a polydispersity of less than 3, and a degree of short chain branching less than 5 per 1000 carbon atoms as determined by GPC FTIR wherein in the difference in densities between components (i) and (ii) is less than 0.030 g/cm³.

2. The bimodal polyethylene composition according to claim 1, having a primary structure parameter (PSP2) from 4 to 7.

3. The bimodal polyethylene composition according to claim 2, wherein component (i) is present in an amount from 20 to 35 weight %.

4. The bimodal polyethylene composition according to claim 3, wherein component (i) has a weight average molecular weight (Mw) from 120,000 to 150,000 g/mol.

5. The bimodal polyethylene composition according to claim 4, wherein component (ii) is present in an amount from 80 to 65 weight %.

6. The bimodal polyethylene composition according to claim 5, wherein component (ii) has a weight average molecular weight (Mw) from 20,000 to 50,000 and a polydispersity of less than 3.

7. The bimodal polyethylene composition according to claim 6, wherein the difference in densities between components (i) and (ii) is less than 0.027 g/cc.

* * * * *